United States Patent
Wu

(10) Patent No.: US 7,978,908 B2
(45) Date of Patent: Jul. 12, 2011

(54) COLOR SIGNAL INTERPOLATION SYSTEM AND METHOD

(75) Inventor: Cheng-Yu Wu, Hsinchu (TW)

(73) Assignee: Sunplus Technology Co., Ltd. (TW)

( * ) Notice: Subject to any disclaimer, the term of this patent is extended or adjusted under 35 U.S.C. 154(b) by 918 days.

(21) Appl. No.: 11/345,303

(22) Filed: Feb. 2, 2006

(65) Prior Publication Data
US 2006/0203292 A1    Sep. 14, 2006

(30) Foreign Application Priority Data

Mar. 9, 2005   (TW) ............................... 94107222 A

(51) Int. Cl.
*G06K 9/00* (2006.01)
*G06T 5/00* (2006.01)
(52) U.S. Cl. ......... 382/162; 382/167; 382/199; 382/300
(58) Field of Classification Search .................. 382/162, 382/167, 199, 300
See application file for complete search history.

(56) References Cited

U.S. PATENT DOCUMENTS

| | | | | |
|---|---|---|---|---|
| 5,729,360 A | * | 3/1998 | Kita et al. ..................... 358/500 |
| 6,697,110 B1 | * | 2/2004 | Jaspers et al. ................. 348/272 |
| 6,727,945 B1 | * | 4/2004 | Jaspers ......................... 348/272 |
| 6,771,838 B1 | * | 8/2004 | Fan .............................. 382/274 |
| 7,139,022 B1 | * | 11/2006 | Raffy ........................... 348/273 |
| 7,339,619 B2 | * | 3/2008 | Tsuruoka ...................... 348/234 |
| 7,583,299 B2 | * | 9/2009 | Kuriyama et al. ........ 348/231.99 |
| 7,623,705 B2 | * | 11/2009 | Arazaki ........................ 382/162 |
| 2002/0167602 A1 | * | 11/2002 | Nguyen ......................... 348/280 |
| 2003/0007082 A1 | * | 1/2003 | Watanabe ...................... 348/273 |
| 2003/0086606 A1 | * | 5/2003 | Hunter et al. ................. 382/167 |

* cited by examiner

*Primary Examiner* — Jon Chang
(74) *Attorney, Agent, or Firm* — Bacon & Thomas PLLC

(57) ABSTRACT

A color signal interpolation system and method, which performs a green sample interpolation on a signal with a cross color sample. The method includes: (A) providing neighboring color samples on an interpolation sample; (B) computing a luminance respectively of the interpolation sample and the neighboring color samples; (C) computing an edge value of the interpolation sample based on the luminance computed; (D) determining if the edge value is smaller than a predetermined threshold; (E) computing an average of the neighboring color samples that have the same color with the interpolation sample when the edge value is smaller than the predetermined threshold, and using the average as a first color output of the interpolation sample.

18 Claims, 5 Drawing Sheets

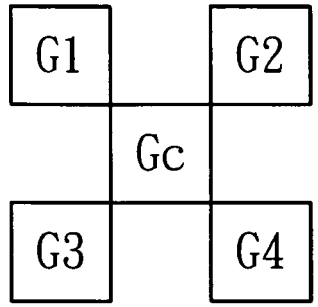
FIG. 3A
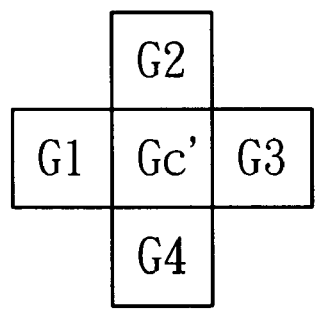
FIG. 3B
| ... | G1 | R2 | G3 | R4 | ... |
|---|---|---|---|---|---|
| ... | B5 | G6 | B7 | G8 | ... |
| ... | G9 | R10 | G11 | R12 | ... |
FIG. 4

```
If (the center green pixel Gc' has to be interpolated)
    if (E < Th) then
        Go = avG;
    else
        Go = Gres (the reconstructed green);
else (the center green pixel Gc is present)
    if (E < Th) then
        Go = avG;
    else
        Go = Gc;
```

FIG. 5

COLOR SIGNAL INTERPOLATION SYSTEM AND METHOD

BACKGROUND OF THE INVENTION

1. Field of the Invention

The invention relates to the technical field of color signal interpolation and, more particularly, to a color signal interpolation system and method for reconstructing green color.

2. Description of Related Art

A color image processing system essentially includes an image capture unit, an image reconstruction and processing unit, an image display and an image compression unit. The image capture unit includes an image sensor and a color filter array (CFA). FIG. 1 is a schematic diagram of a Bayer CFA and associated interpolation operations. As shown in FIG. 1, the frame is arranged in a form of interlaced GR-contained row and BG-contained row, where R, G and B are the three primary colors: green, red and blue (RGB). Each photosite in the CFA can have only one of RGB. The image reconstruction and processing unit thus uses an interpolation to reconstruct missing colors for each photosite, which fills up the respective green, red and blue planes.

In addition, the image sensor has the pixel crosstalk effect in which, when a pixel is illuminated by a light, charge generation and signal transmission will diffuse to the neighboring pixels due to the semiconductor process in pixel layout and production. In accordance with the observations and experiences, the horizontal crosstalk effect is stronger than the vertical crosstalk effect. For the example of Bayer color filter array, red and blue pixels present the crosstalk on the respective left and right green pixels. Due to the pixel crosstalk effect, the left and right green pixels relative to a red pixel have different outputs from those relative to a blue one. In this case, the pixel value of a green photosite presents an error component. Thus, the pixel crosstalk effect can be seen obviously in a flat area when an interpolation is used to reconstruct each pixel's red, green and blue values because of the result of error component.

To overcome this problem, U.S. Pat. No. 6,727,945 granted to Jaspers for a "Color signal interpolation" has disclosed that a difference of green photosites at different rows is compared to a threshold to accordingly determine if a corresponding photosite locates on an edge area, thereby selecting one from an original green value of the photosite, a interpolation value, or an average value for the corresponding photosite. However, the threshold is computed with pixels (on the RGB domain) captured by the image sensor, which encounters the problems of lower representative, easy to cause a resolution reduction, and hard to improve the crosstalk effect caused by a green error. Therefore, it is desirable to provide an improved color signal interpolation system and method to mitigate and/or obviate the aforementioned problems.

SUMMARY OF THE INVENTION

The object of the invention is to provide a color signal interpolation system and method, which can avoid the resolution reduction and reduce the crosstalk effect caused by the green error.

In accordance with one aspect of the present invention, there is provided a color signal interpolation method. The method performs a first color sample interpolation on a signal with a cross-color sample. The method includes the steps of: (A) providing neighboring color samples on an interpolation sample; (B) computing a luminance respectively of the interpolation sample and the neighboring color samples; (C) computing an edge value of the interpolation sample in accordance with the luminance computed; (D) determining if the edge value is smaller than a predetermined threshold; (E) computing an average of the neighboring color samples that have the same color with the interpolation sample when the edge value is smaller than the predetermined threshold, and using the average as a first color output of the interpolation sample.

In accordance with another aspect of the present invention, there is provided a color signal interpolation method, which performs a first color sample interpolation on a signal with a cross-color sample. The method includes the steps of: (A) providing neighboring color samples on an interpolation sample; (B) computing a flat value of the interpolation sample; (C) determining if the flat value is smaller than a predetermined threshold; (D) computing an average of the neighboring color samples that have the same color with the interpolation sample when the flat value is smaller than the predetermined threshold, and using the average as a first color output of the interpolation sample.

In accordance with a further aspect of the present invention, there is provided a color signal interpolation system, which performs a first color sample interpolation on a signal with a cross-color sample. The system includes a sensor, a line buffer, a luminance compute device, an edge determinator, a reconstruction filter, an average device and a selector. The sensor provides the signal with the cross-color sample. The line buffer is connected to the sensor in order to store color samples of the signal. The luminance compute device is connected to the line buffer in order to compute a luminance respectively of an interpolation sample and neighboring color samples that neighbor with the interpolation sample. The edge determinator is connected to the luminance compute device in order to compute an edge value of the interpolation sample in accordance with the luminance computed, and determine if the edge value is smaller than a predetermined threshold. The reconstruction filter is connected to the line buffer in order to perform an interpolation computation on the interpolation sample to thus produce a first color interpolation value. The average device is connected to the line buffer in order to compute an average of the neighboring color samples that have the same color with the interpolation sample. The selector is connected to the line buffer, the edge determinator, the average device and the reconstruction filter in order to select one of the interpolation sample, the first color interpolation value and the average as a first color output. When the edge value is smaller than the predetermined threshold, the average is selected as the first color output of the interpolation sample.

Other objects, advantages, and novel features of the invention will become more apparent from the following detailed description when taken in conjunction with the accompanying drawings.

BRIEF DESCRIPTION OF THE DRAWINGS

FIG. 3A is a schematic diagram of a green photosite and its neighboring green pixels in accordance with the invention;

FIG. 3B is a schematic diagram of a non-green photosite and its neighboring green pixels in accordance with the invention;

FIG. 4 is a schematic diagram of a line buffer storing data in accordance with the invention;

FIG. 5 is a schematic view of pseudo codes implemented in a selector in accordance with the invention.

DETAILED DESCRIPTION OF THE PREFERRED EMBODIMENT

Figure 2:
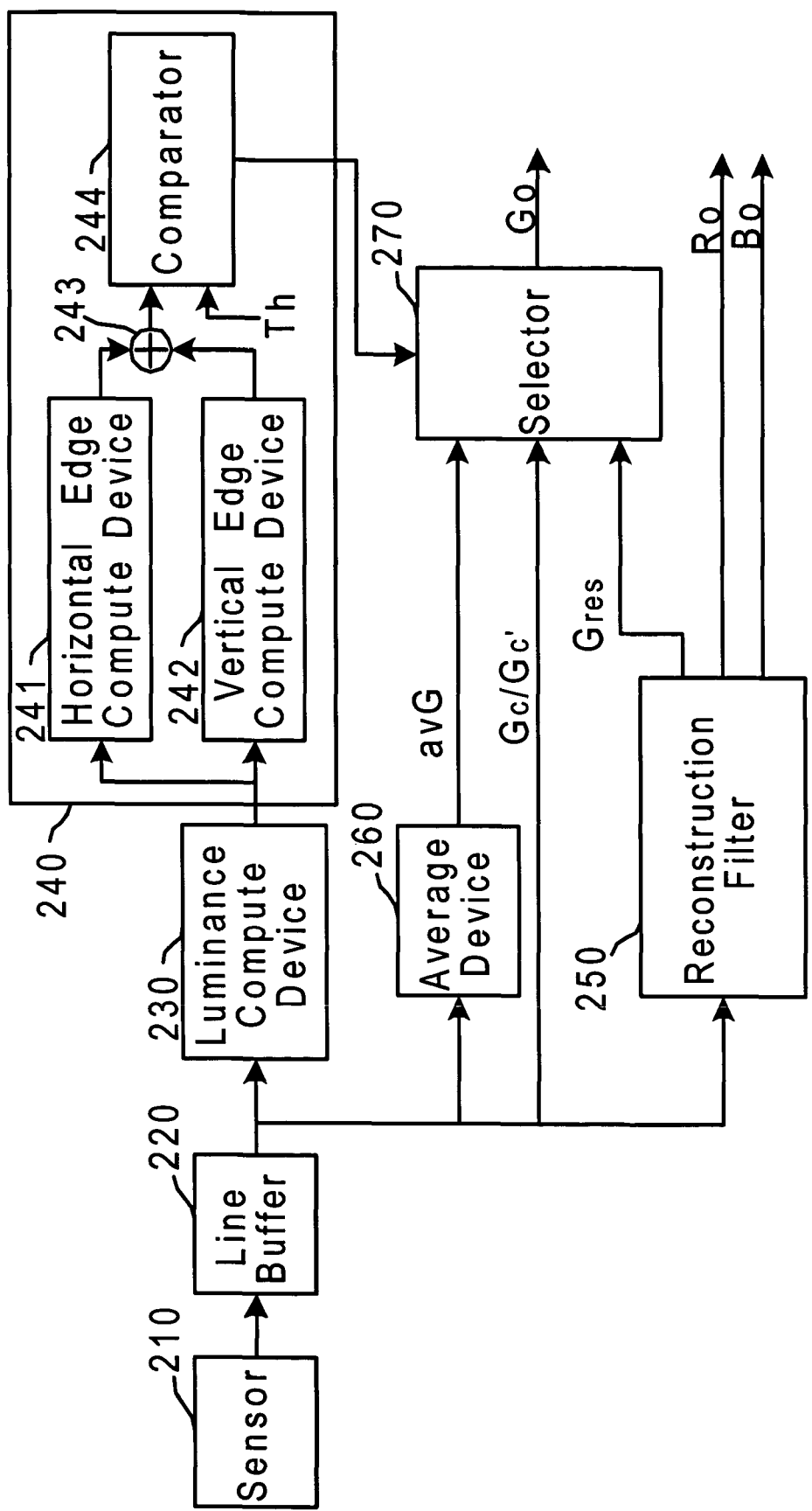
FIG. 2 is a block diagram of a color signal interpolation system in accordance with the invention.

FIG. 2 is a block diagram of a color signal interpolation system in accordance with the invention, which performs a first color (green) sample interpolation on a signal with a cross-color sample. The system first converts pixels from the Bayer pattern domain, a subset of the RGB domain, to a luminance domain, and then computes the edges of the pixels. Because the edges are estimated on the luminance domain, it is determined accurately that a pixel to be interpolated locates in a flat area or edge area. In FIG. 2, the system includes a sensor 210, a line buffer 220, a luminance compute device 230, an edge determinator 240, a reconstruction filter 250, an average device 260 and a selector 270.

Figure 1:
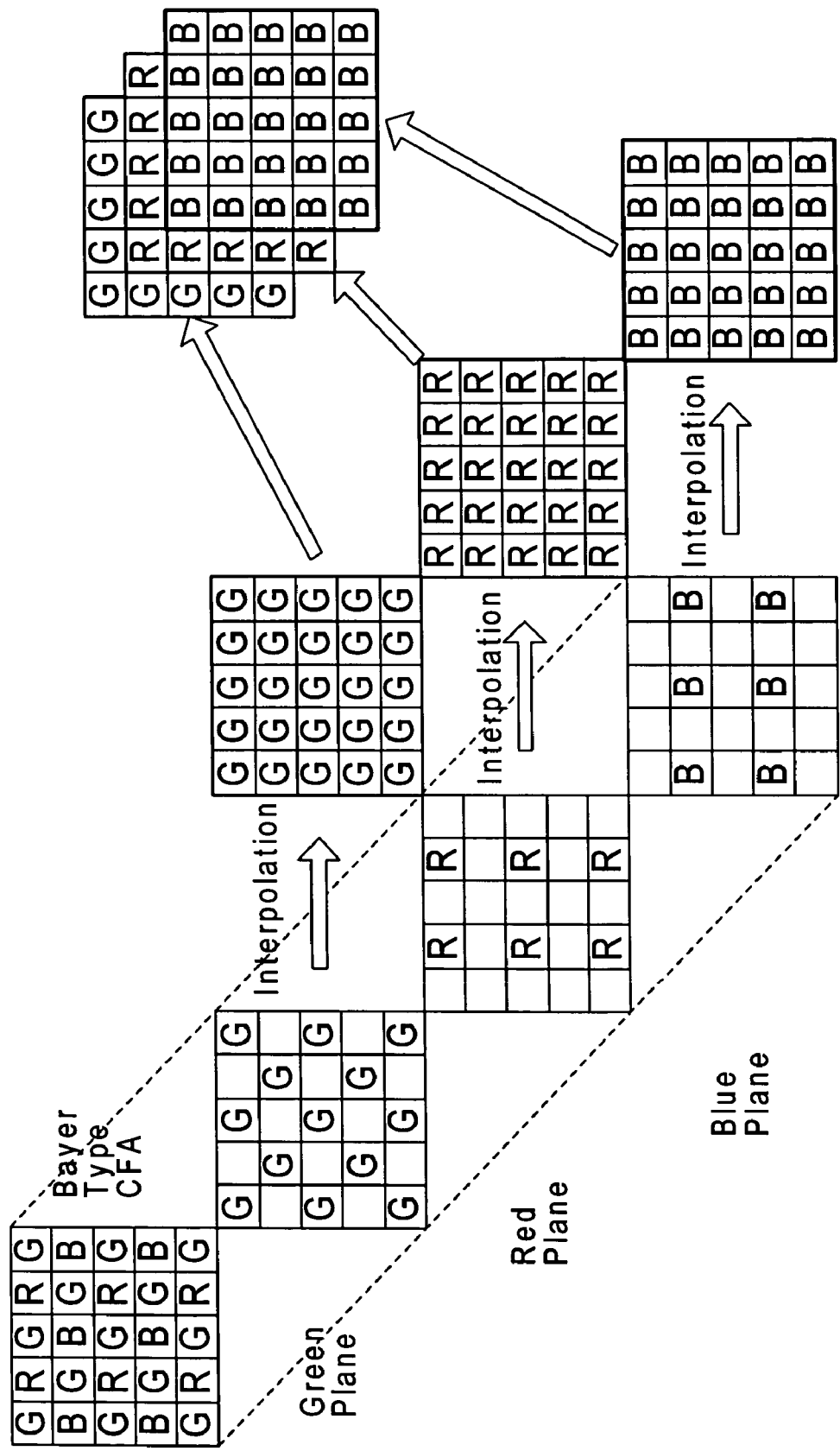
FIG. 1 is a schematic diagram of a Bayer color filter array and associated interpolation operations.

The sensor 210 has the Bayer color filter array to provide the signal with the cross-color sample. In the FIG. 1, the photosites of the sensor 210 are arranged in a Bayer pattern. FIG. 3A is a schematic diagram of a green photosite and its neighboring green pixels in accordance with the invention. FIG. 3B is a schematic diagram of a non-green photosite and its neighboring green pixels in accordance with the invention.

The line buffer 220 is connected to the sensor 210 in order to store color samples of the signal. In this case, the line buffer 220 includes three lines to store data shown in FIG. 4.

The luminance compute device 230, which is connected to the line buffer 220, computes a luminance on an interpolation sample and luminance of color samples neighboring the interpolation sample. In order to cooperate with the line buffer 220, the luminance compute device 230 can be a 3×3 filter with coefficients of [1 2 1, 2 4 2, 1 2 1]. In this case, the luminance, for example, of G6 in the FIG. 4 can be computed as (1*G1+2*R2+1*G3+2*B5+4*G6+2*B7+1*G9+2*R10+1*G11). Similarly, the luminance of B7 in FIG. 4 can be computed as (1*R2+2*G3+1*R4+2*G6+4*B7+2*G8+1*R10+2*G11+1*R12).

The edge determinator 240, which is connected to the luminance compute device 230, computes an edge value of the interpolation sample in accordance with the luminance computed, and determine if the edge value is smaller than a predetermined threshold Th. The edge determinator 240 includes a horizontal edge compute device 241, a vertical edge compute device 242, an adder 243 and a comparator 244.

The horizontal edge compute device 241 can be a 3×3 filter with coefficients of [1 2 1, 0 0 0, -1 -2 -1] to computes a horizontal edge value Eh. When the luminance compute device 230 outputs the luminance of [Y1 Y2 Y3, Y4 Y5 Y6, Y7 Y8 Y9], the horizontal edge value Eh is a value of (1*Y1+2*Y2+1*Y3-(1*Y7+2*Y8+1*Y9)). The smaller a value Eh is, the more flatness on the corresponding interpolation sample is. The vertical edge compute device 242 can be a 3×3 filter with coefficients of [-1 0 1, -2 0 2, -1 0 1] to compute a vertical edge value Ev. When the luminance compute device 230 outputs the luminance of [Y1 Y2 Y3, Y4 Y5 Y6, Y7 Y8 Y9], the vertical edge value Ev is a value of (-1*Y1+1*Y3-2*Y4+2*Y6-1*Y7+1*Y9). The smaller a value Ev is, the more flatness on the corresponding interpolation sample is.

The adder 243 adds the values Eh and Ev to thus obtain an edge value E (or flat value). When the edge value E is smaller in comparison with the threshold Th, it indicates the corresponding interpolation sample locates on a flat area.

The reconstruction filter 250, which is connected to the line buffer 220, performs an interpolation computation for the interpolation sample Gc or Gc' to thus produce a green interpolation value Gres. The green interpolation value Gres of an interpolation sample is obtained by computing an averaged gradient in a direction with a smaller gradient. For example, the gradients on the interpolation sample Gc of FIG. 3A are |G1-G4| and |G2-G3|, and accordingly the green interpolation value Gres can be (G1+G4)/2 or (G2+G3)/2. Similarly, the gradients on the interpolation sample Gc' of FIG. 3B are |G2-G4| and |G1-G3|, and accordingly the green interpolation value Gres can be (G2+G4)/2 or (G1+G3)/2.

The average device 260 is connected to the line buffer 220 in order to compute an average avG of same color samples adjacent to the interpolation sample Gc or Gc'. Accordingly, either of the sample Gc of FIG. 3A and the sample Gc' of FIG. 3B can have the average avG of (G1+G2+G3+G4)/4. Therefore, due to the average operation, the neighboring red and blue pixels have reduced affection on a green pixel, and the crosstalk effect can be reduced.

The selector 270 is connected to the line buffer, the edge determinator, the average device and the reconstruction filter in order to select one of the interpolation sample Gc, the green interpolation value Gres and the average avG as a green output (Go) of the sample Gc or Gc'. For the sample Gc' of FIG. 3B, when the edge value E is smaller than the predetermined threshold Th, it indicates the sample Gc' locates on a flat area, and the average avG is selected as the green output (Go). Conversely, when the edge value E is not smaller than the predetermined threshold Th, it indicates the sample Gc' does not locate on a flat area, and the value Gres is selected as the green output (Go).

For the sample Gc of FIG. 3A, when the edge value E is smaller than the predetermined threshold Th, it indicates the sample Gc locates on a flat area, and the green value of the sample Gc is close to those of the neighboring green pixels. Thus, the average avG is selected as the green output (Go). Conversely, when the edge value E is not smaller than the predetermined threshold Th, it indicates the sample Gc does not locate on a flat area, and the sample Gc is selected as the green output (Go). FIG. 5 is the schematic view of the pseudo codes implemented in the selector 270, which can be converted easily as a hardware description language such as Verilog, VHDL or SystemC.

Figure 6:
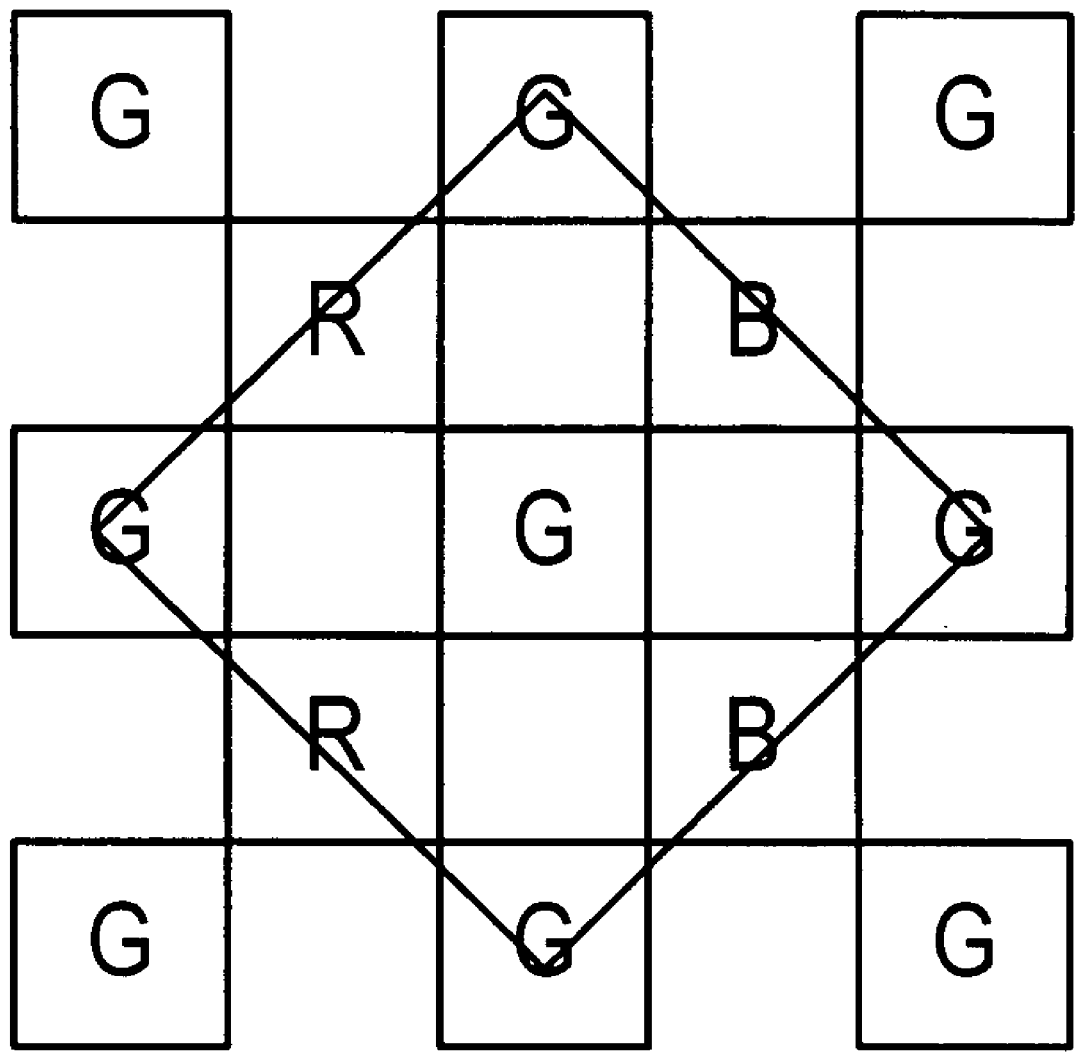
FIG. 6 is a schematic diagram of a color filter array of a Fuji film micro device color filter array in accordance with the invention.

In this embodiment, the sensor 210 is implemented by the Bayer color filter array, but not limited to it. As shown in FIG. 6, a color filter array of the Fuji film micro device can also be used to implement the sensor 210, which can be easily achieved by those persons skilled in the art, and thus a detailed description is deemed unnecessary.

As compared with a red pixel and a blue pixel, the color value of a green pixel has a greater luminance, and accordingly the noise reduction on the green color value is relatively important. The invention first converts the pixels from the Bayer pattern domain, a subset of the RGB domain to a luminance domain and then computes the edges of the pixels. Because the edges are estimated on the luminance domain, it is determined accurately that a pixel to be interpolated locates on a flat or edge area. Therefore, the invention can avoid the resolution reduction and reduce the crosstalk effect caused by the error of green color value.

Although the present invention has been explained in relation to its preferred embodiment, it is to be understood that many other possible modifications and variations can be made without departing from the spirit and scope of the invention as hereinafter claimed.

What is claimed is:

1. A color signal interpolation method implemented in a color signal interpolation system including a sensor, a luminance compute device, an edge determinator and an average device, for performing a first color sample interpolation on a signal with a cross-color sample, the method comprising the steps of:
   (A) providing Bayer pattern neighboring color samples on an interpolation sample by the sensor, wherein the sensor has a Bayer color filter array;
   (B) computing a luminance respectively of the interpolation sample and the Bayer pattern neighboring color samples by the luminance compute device;
   (C) the edge determinator computing an edge value of the interpolation sample by using the luminance respectively of the interpolation sample and the neighboring color samples computed in step (B) based on a luminance domain wherein the luminance is the total of all colors of the Bayer pattern;
   (D) determining if the edge value is smaller than a predetermined threshold by the edge determinator; and
   (E) the average device computing an average of the neighboring color samples having the same color with the interpolation sample when the edge value is smaller than the predetermined threshold, and using the average as a first color output of the interpolation sample.

2. The method as claimed in claim 1, wherein, in the step (E), the average device performs an interpolation computation on the neighboring color samples having the same color with the interpolation sample when the edge value is not smaller than the predetermined threshold, to thus obtain an interpolation value as the first color output of the interpolation sample.

3. The method as claimed in claim 2, wherein the interpolation computation computes gradients on the interpolation sample and takes an average in a direction with a smaller gradient as the interpolation value.

4. The method as claimed in claim 1, wherein the edge value in the step (D) is a sum of the horizontal edge value and vertical edge value.

5. The method as claimed in claim 1, wherein the first color is green.

6. A color signal interpolation method implemented in a color signal interpolation system including a sensor, a luminance compute device, an edge determinator and an average device, for performing a first color sample interpolation on a signal with a cross-color sample, the method comprising the steps of
   (A) providing Bayer pattern neighboring color samples on an interpolation sample by the sensor, wherein the sensor has a Bayer color filter array;
   (B) computing a flat value of the interpolation sample by using a luminance respectively of the interpolation sample and the Bayer pattern neighboring color samples by the edge determinator, wherein the luminance is the total of all colors of the Bayer pattern;
   (C) determining if the flat value is smaller than a predetermined threshold by the edge determinator; and
   (D) the average device computing an average of the neighboring color samples having the same color with the interpolation sample when the flat value is smaller than the predetermined threshold, and using the average as a first color output of the interpolation sample.

7. The method as claimed in claim 6, wherein, in the step (D), the average device performs an interpolation computation on the neighboring color samples having the same color with the interpolation sample when the flat value is not smaller than the predetermined threshold, to thus obtain an interpolation value as the first color output of the interpolation sample.

8. The method as claimed in claim 7, wherein the interpolation computation computes gradients on the interpolation sample and takes an average in a direction with a smaller gradient as the interpolation value.

9. The method as claimed in claim 6, wherein the step (B) further comprises the steps of;
   (B1) the luminance compute device computing a luminance respectively of the interpolation sample and the neighboring color samples;
   (B2) the edge determinator computing a horizontal edge value and a vertical edge value based on the luminance computed in the step (B1); and
   (B3) the edge determinator adding the horizontal edge value and the vertical edge value as the flat value of the interpolation sample.

10. The method as claimed in claim 6, wherein the first color is green.

11. A color signal interpolation system, which performs a first color sample interpolation on a signal with a cross-color sample, the system comprising:
    a sensor, which has a Bayer color filter array and provides the signal with the cross-color sample;
    a line buffer, which is connected to the sensor, for storing color samples of the signal;
    a luminance compute device, which is connected to the line buffer, for computing a luminance respectively of an interpolation sample and Bayer pattern neighboring color samples wherein the luminance is the total of all colors of the Bayer pattern;
    an edge determinator, which is connected to the luminance compute device, for computing an edge value of the interpolation sample by using the luminance computed, and determining if the edge value is smaller than a predetermined threshold;
    a reconstruction filter, which is connected to the line buffer, for performing an interpolation computation on the interpolation sample to thus produce a first color interpolation value;
    an average device, which is connected to the line buffer, for computing an average of the neighboring color samples having the same color with the interpolation sample; and
    a selector, which is connected to the line buffer, the edge determinator, the average device and the reconstruction filter in order to select one of the interpolation sample, the first color interpolation value and the average as a first color output of the interpolation sample;
    wherein the average is selected as the first color output of the interpolation sample when the edge value is smaller than the predetermined threshold.

12. The system as claimed in claim 11, wherein the luminance compute device is a digital filter.

13. The system as claimed in claim 12, wherein the luminance compute device computes the luminance based on R, G, and B signal of the interpolation sample and the Bayer pattern neighboring color samples.

14. The system as claimed in claim 11, wherein the edge determinator further comprises:
    a horizontal edge compute device, which is connected to the luminance compute device in order to compute a horizontal edge value of the interpolation sample based on the luminance computed;

a vertical edge compute device, which is connected to the luminance compute device, for computing a vertical edge value of the interpolation sample based on the luminance computed;

an adder, which is connected to the horizontal edge compute device and the vertical edge compute device, for adding the horizontal edge value and the vertical edge value as the edge value to output; and a comparator, which is connected to the adder in order to determine if the edge value is smaller than the predetermined threshold.

15. The system as claimed in claim 14, wherein the horizontal edge compute device is a digital filter.

16. The system as claimed in claim 14, wherein the vertical edge compute device is a digital filter.

17. A color signal interpolation method converting pixels from an RGB domain to a luminance domain and implemented in a color signal interpolation system including a sensor, a luminance compute device, an edge determinator, an average device and a selector, for performing a first color sample interpolation on a signal with a cross-color sample, the method comprising the steps of (A) providing neighboring color samples on an interpolation sample by the sensor;

(B) computing a luminance respectively of the interpolation sample and the neighboring color samples by the luminance compute device wherein the luminance is the total of all colors of a Bayer pattern;

(C) computing with the edge determinator an edge value of the interpolation sample by using the luminance respectively of the interpolation sample and the neighboring color samples computed in step (B) based on a luminance domain;

(D) determining if the edge value is smaller than a predetermined threshold by the edge determinator; and (E) computing with the average device an average of the neighboring color samples having the same color with the interpolation sample and when the edge value is smaller than the predetermined threshold, the interpolation sample is located on a flat area and when the edge value is not smaller than the predetermined threshold, the interpolation sample is not located on a flat area and thus avoiding resolution reduction and reducing a crosstalk effect caused by error of the green color value.

18. The method as claimed in claim 17, wherein the selector selects one of the interpolation sample (Ge or Ge'), the green interpolation value (Ores) and the average (avG) as a green output (Go) of the sample Gc or Gc' and when the interpolation sample is located on a flat area the avG is selected as the green output Go and when the interpolation sample is not located on a flat area Gres is selected as the green output Go.

* * * * *